(12) United States Patent
Bartram et al.

(10) Patent No.: US 8,378,847 B2
(45) Date of Patent: Feb. 19, 2013

(54) PIT MOUNT INTERFACE DEVICE

(75) Inventors: Stephen J. Bartram, Ocala, FL (US); Jorge I. Ortiz, Ocala, FL (US)

(73) Assignee: Elster Amco Water, LLC, Ocala, FL (US)

( * ) Notice: Subject to any disclaimer, the term of this patent is extended or adjusted under 35 U.S.C. 154(b) by 210 days.

(21) Appl. No.: 12/855,917

(22) Filed: Aug. 13, 2010

(65) Prior Publication Data

US 2011/0063124 A1  Mar. 17, 2011

Related U.S. Application Data

(60) Provisional application No. 61/241,721, filed on Sep. 11, 2009.

(51) Int. Cl.
*G08C 15/06* (2006.01)
(52) U.S. Cl. .......... 340/870.02; 340/870.01; 340/870.03
(58) Field of Classification Search ............. 340/870.01, 340/870.02, 870.03; 343/719; 439/277
See application file for complete search history.

(56) References Cited

U.S. PATENT DOCUMENTS

| | | | |
|---|---|---|---|
| 1,781,280 A | 11/1930 | Haase et al. |
| 3,457,835 A | 7/1969 | Siebold |
| 4,463,354 A | 7/1984 | Sears |
| 5,298,894 A | 3/1994 | Cerny et al. |
| 5,416,475 A | 5/1995 | Tolbert et al. |
| 5,583,492 A | 12/1996 | Nakanishi et al. |
| 5,619,192 A | 4/1997 | Ayala |
| 5,654,701 A | 8/1997 | Liao et al. |
| 5,659,300 A | 8/1997 | Dresselhuys et al. |
| 5,703,601 A | 12/1997 | Nalbandian et al. |
| 5,747,701 A | 5/1998 | Marsh et al. |
| 5,777,222 A | 7/1998 | Roberts |
| 5,825,303 A | 10/1998 | Bloss, Jr. et al. |
| 5,877,703 A | 3/1999 | Bloss, Jr. et al. |
| 5,918,618 A | 7/1999 | Neupert |
| 5,970,791 A | 10/1999 | Barczynski et al. |
| 6,166,692 A | 12/2000 | Nalbandian et al. |
| 6,177,883 B1 | 1/2001 | Jennetti et al. |
| 6,181,257 B1 | 1/2001 | Meek et al. |
| 6,218,995 B1 | 4/2001 | Higgins et al. |
| 6,269,829 B1 | 8/2001 | Chen et al. |

(Continued)

FOREIGN PATENT DOCUMENTS

| | | |
|---|---|---|
| EP | 0252184 A1 | 1/1988 |
| JP | 2002081972 A | 3/2002 |

(Continued)

OTHER PUBLICATIONS

"Water metering systems solutions—Measurement systems, reading systems, and project management", from www.elsteramcowater.com/en/downloads/WMSS.pdf.

(Continued)

*Primary Examiner* — Joseph Chang
*Assistant Examiner* — Jeffrey Shin
(74) *Attorney, Agent, or Firm* — Duane Morris LLP (57) ABSTRACT

A pit mount interface device includes a body having a head and an elongate stem extending from a bottom surface of the head. The elongate stem is sized and configured to be received in and extend through a hole formed in a cover of a pit. A nut defines a central aperture that is sized and configured to receive the elongate stem of the body. A passive radiator is disposed within the body and configured receive a radio frequency (RF) signal transmitted by an automatic meter reading (AMR) device located below the cover through inductive coupling and to radiate the RF signal from a position located above the cover of the pit.

26 Claims, 8 Drawing Sheets

U.S. PATENT DOCUMENTS

| | | | |
|---|---|---|---|
| 6,300,907 B1 | 10/2001 | Lazar et al. | |
| 6,369,769 B1 * | 4/2002 | Nap et al. | 343/719 |
| 6,378,817 B1 | 4/2002 | Bublitz et al. | |
| 6,424,269 B1 | 7/2002 | Pederson | |
| 6,568,645 B2 | 5/2003 | Maddox | |
| 6,617,976 B2 | 9/2003 | Walden et al. | |
| 6,657,552 B2 | 12/2003 | Belski et al. | |
| 6,708,571 B1 | 3/2004 | Hopfe et al. | |
| 6,819,292 B2 | 11/2004 | Winter | |
| 6,897,374 B2 | 5/2005 | Garber et al. | |
| 6,904,788 B2 | 6/2005 | Sandford et al. | |
| 6,933,857 B2 | 8/2005 | Foote | |
| 6,953,046 B2 | 10/2005 | Chen et al. | |
| 6,954,144 B1 | 10/2005 | Kiser et al. | |
| 6,954,178 B2 | 10/2005 | Winter | |
| 6,990,414 B2 | 1/2006 | Belke et al. | |
| 7,053,767 B2 | 5/2006 | Petite et al. | |
| 7,059,200 B2 | 6/2006 | Sallee | |
| 7,079,810 B2 | 7/2006 | Petite et al. | |
| 7,103,511 B2 | 9/2006 | Petite | |
| 7,126,551 B2 | 10/2006 | Winter | |
| 7,137,550 B1 | 11/2006 | Petite | |
| 7,171,852 B2 | 2/2007 | Smich et al. | |
| 7,202,828 B2 | 4/2007 | Zehngut et al. | |
| 7,209,840 B2 | 4/2007 | Petite et al. | |
| 7,228,726 B2 | 6/2007 | Kates | |
| 7,263,073 B2 | 8/2007 | Petite et al. | |
| 7,267,014 B2 | 9/2007 | Winter | |
| 7,277,027 B2 | 10/2007 | Ehrke et al. | |
| 7,283,063 B2 * | 10/2007 | Salser, Jr. | 340/870.02 |
| 7,290,456 B2 | 11/2007 | Sallee | |
| 7,295,128 B2 | 11/2007 | Petite | |
| 7,325,782 B2 | 2/2008 | Gebler et al. | |
| 7,346,463 B2 | 3/2008 | Petite et al. | |
| 7,353,966 B2 | 4/2008 | McKinnon, Jr. | |
| 7,365,687 B2 | 4/2008 | Borleske et al. | |
| 7,391,324 B1 | 6/2008 | Pflugrath et al. | |
| 7,397,907 B2 | 7/2008 | Petite | |
| 7,424,527 B2 | 9/2008 | Petite | |
| 7,446,672 B2 | 11/2008 | Johnson et al. | |
| 7,480,501 B2 | 1/2009 | Petite | |
| 7,533,581 B2 | 5/2009 | Sallee | |
| 2003/0052790 A1 | 3/2003 | Dunstan | |
| 2005/0285807 A1 * | 12/2005 | Zehngut et al. | 343/719 |
| 2006/0169868 A1 | 8/2006 | Anderson et al. | |
| 2006/0218104 A1 | 9/2006 | Johnson et al. | |
| 2006/0272830 A1 | 12/2006 | Fima | |
| 2008/0074283 A1 * | 3/2008 | Verkleeren et al. | 340/870.02 |
| 2008/0238714 A1 | 10/2008 | Ehrke et al. | |
| 2008/0316050 A1 | 12/2008 | Showcatally | |

FOREIGN PATENT DOCUMENTS

| | | | |
|---|---|---|---|
| WO | 0139222 | A3 | 3/2001 |
| WO | 2008039697 | A1 | 4/2008 |

OTHER PUBLICATIONS

"100,000 gas meter network made a reality thanks to Wavenis Technology", from http://www.m2mpremier.com/UploadFiles/Coronis_CS_SmartMetering.pdf.

RPM Series Rotary Gas Meters with Continuous Mechanical Temperature Compensator, American Meter Company, 4 pages, published Mar. 2002.

Enoch, M., "AMR technology helps utility expand service, contain costs", Pipe Line & Gas Industry, Mar. 2000, pp. 97-99.

Elster Amco Profiles, "RVG G10-G25 A New Star in the Metering Program", 2002, vol. 1, 19 pages, from www.elster.com.

Canadian Office Action issued on Jul. 19, 2012 in corresponding Canadian Patent Application No. 2,712,766, pp. 1-4.

* cited by examiner

PIT MOUNT INTERFACE DEVICE

CROSS-REFERENCE TO RELATED APPLICATIONS

This application claims priority to U.S. Provisional Patent Application Ser. No. 61/241,721 filed on Sep. 11, 2009, the entirety of which is herein incorporated by reference.

FIELD OF DISCLOSURE

The disclosed systems and methods relate to automated meter reading devices. More specifically, the disclosed system and methods relate to mounting automated reading devices in utility pits formed in the ground.

BACKGROUND

A longstanding problem in the utility industry is an economically efficiently way reading of utility meters without inconveniencing the dwelling resident. Manual meter reading has a significant disadvantage in that it requires a large amount of manpower, leading to significant expense. Further, meter readers may erroneously record the numeral values of the meter register or the homeowner may not be present at the time the meter reading is to take place.

In order to solve the personnel requirements of physical meter reading, a large number of remote meter reading units have been developed. These meter reading units may be, for example, an automatic meter reading (AMR) unit such as the Evolution™ available from Elster AMCO Water of Ocala, Fla. The meter register comprises a sensor to detect the rotation of movement of the components within the meter to generate an electrical count of the volume of commodity that flows through the meter. The recorded data from the meter is broadcast by a communication device of the AMR unit using a radio frequency (RF) signal. In such types of systems, the meter measurement is broadcast from the communication device using an RF signal that can be read from a remote location. In these remote meter reading systems, the antenna of the communication device is typically included in the AMR unit and is located underground in the meter pit. In many situations, the pit lid or cover is formed from a metallic material, such as iron, that significantly inhibits the transmission of radio frequency signals therethrough.

As the use of fixed network AMR systems for commercial, residential, and remote applications increases, the need for a robust antenna assembly has become increasingly important. Since many meter pit locations were established as the original water infrastructure was constructed, improvements to the roadways and sidewalks, as well as a reduction in costs, has forced the need for safe, low profile and rugged metering products. Currently, AMR antennas are being used on sidewalks where pedestrian traffic may interact with the antenna assembly and in areas of heavy vehicular traffic. Thus, antenna designs must achieve a balance between physical size, RF performance and mechanical strength to make the products ideally suited for long-range communication, supporting vehicle traffic and pedestrian safety.

Accordingly, an improved pit mount interface (PMI) device and antenna assembly are desirable.

SUMMARY

A pit mount interface device is disclosed that includes a body having a head and an elongate stem extending from a bottom surface of the head. The elongate stem is sized and configured to be received in and extend through a hole formed in a cover of a pit. A nut defines a central aperture that is sized and configured to receive the elongate stem of the body. A passive radiator is disposed within the body and configured receive a radio frequency (RF) signal transmitted by an automatic meter reading (AMR) device located below the cover through inductive coupling and to radiate the RF signal from a position located above the cover of the pit.

Also disclosed is a pit mount interface device including a body having a head and an elongate stem that extends from a bottom surface of the head. The elongate stem has a width that is smaller than a width of the head and includes at least one thread disposed on an external surface. A nut defines a central aperture that is sized and configured to receive the elongate stem of the body. An interior surface of the nut includes a thread configured to engage the thread disposed on the external surface of the elongate stem. A passive radiator is disposed within a channel defined by the head of the body and is configured to receive a radio frequency (RF) signal transmitted by an automatic meter reading (AMR) device disposed adjacent to a coupling section of the passive radiator through inductive coupling and to radiate the RF signal from a radiating section of the passive radiator positioned above a cover of a pit. A cap is configured to be coupled to the head of the body such that the radiating section of the antenna is secured within the slot.

A method of installing a pit mount interface device is also disclosed. The method includes inserting a passive radiator into a mounting body having an elongate stem that extends from a head. The elongate stem has a substantially circular cross-sectional area defining a central passageway. A cap is attached to the head of the mounting body to secure the passive radiator within the mounting body, and the elongate stem is inserted into a hole defined by a cover of a pit until a bottom surface of the head of the elongate body contacts a surface of the cover. A clamp nut is fastened to the elongate stem to secure the mounting body to the cover.

The foregoing and other aspects will be apparent from the following description of the preferred embodiments. In the description, reference is made to the accompanying drawings which form a part hereof, and in which there is shown by way of illustration, and not limitation, a preferred embodiment. Such embodiment does not necessarily represent the full scope of the invention, and reference must therefore be made to the claims herein for interpreting the scope of the invention and its equivalents.

BRIEF DESCRIPTION OF THE DRAWINGS

These and other features and advantages of the present invention will be more fully disclosed in, or rendered obvious by the following detailed description of the preferred embodiments of the invention, which are to be considered together with the accompanying drawings wherein like numbers refer to like parts and further wherein.

DETAILED DESCRIPTION

This description of preferred embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 1:
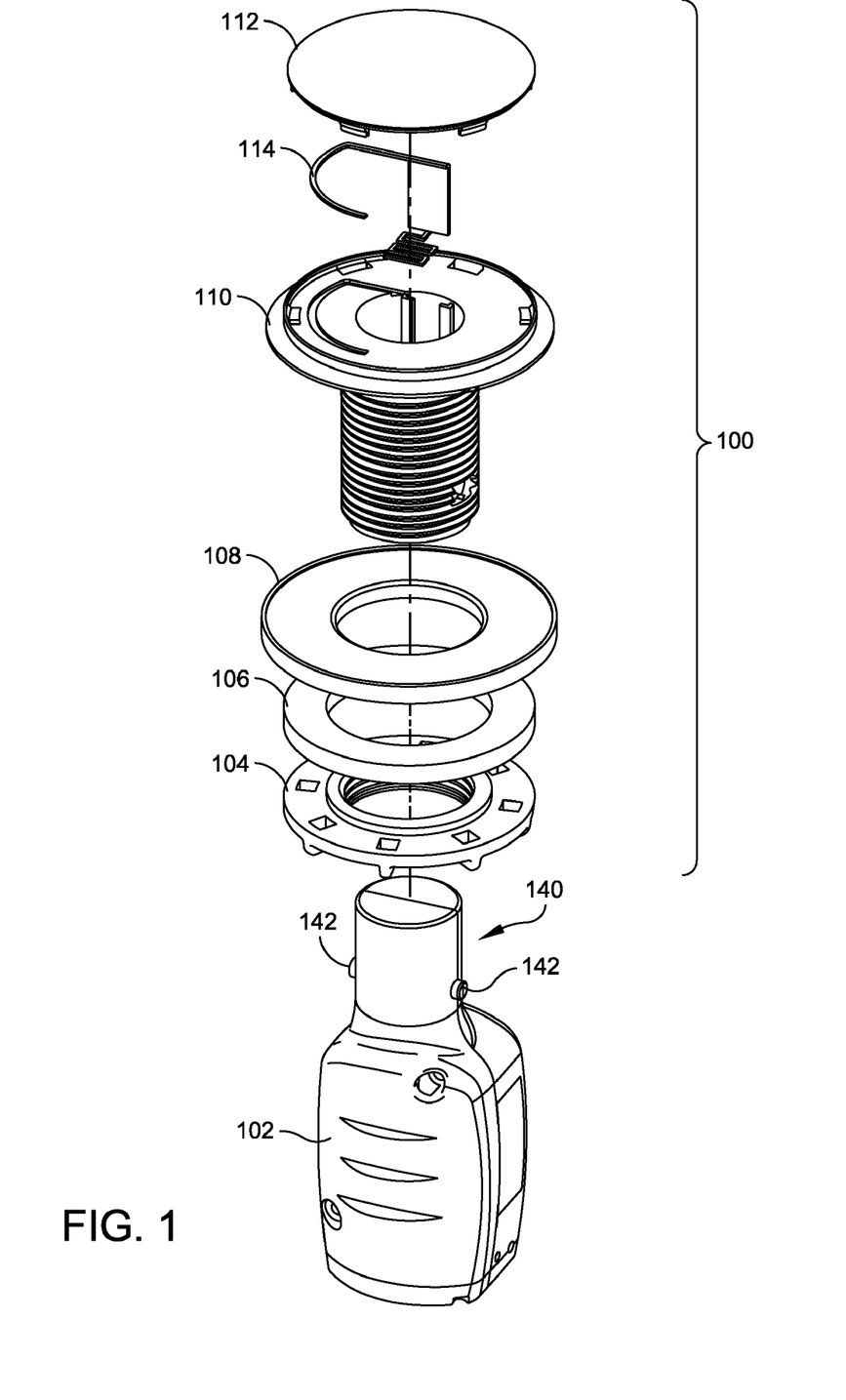
FIG. 1 is an exploded assembly view of an improved pit mount interface device for mounting an automatic meter reading device.

FIG. 1 illustrates an improved pit mount interface ("PMI") device 100 for coupling an automated meter reading ("AMR") unit 102 to a cover of a utility pit. As shown in FIG. 1, the PMI device 100 includes a clamp nut 104, a washer 106, a spacer 108, a mounting body 110, and a cap 112. The mounting body 110 and cap 112 house and secure a passive radiator 114 within the mounting body. The passive radiator is configured to receive a signal transmitted by an antenna disposed in the AMR device 100 below a pit cover through inductive coupling and radiate the signal from a position above the pit cover.

Figure 2:
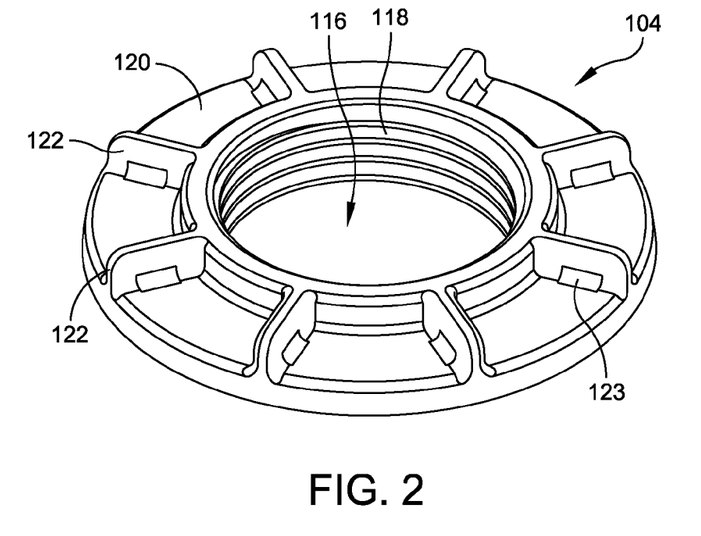
FIG. 2 is a top isometric view of one example of a clamp nut in accordance with the improved pit mount interface device illustrated in FIG. 1.
Figure 3:
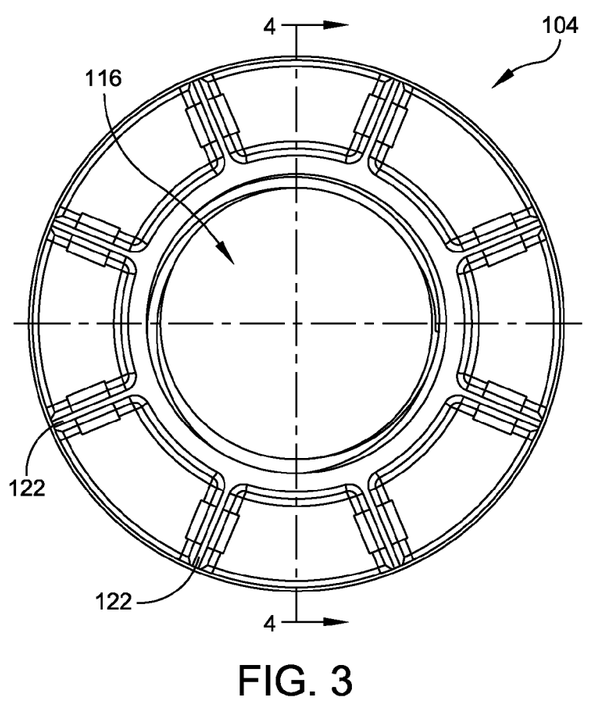
FIG. 3 is a top side plan view of the clamp nut illustrated in FIG. 2.
Figure 4:
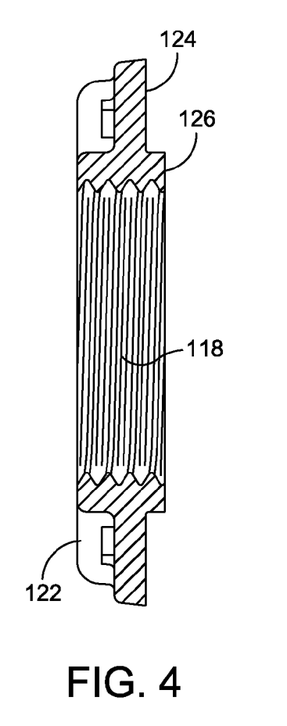
FIG. 4 is a sectional view of the clamp nut taken along line 4-4 in FIG. 3.
Figure 5:
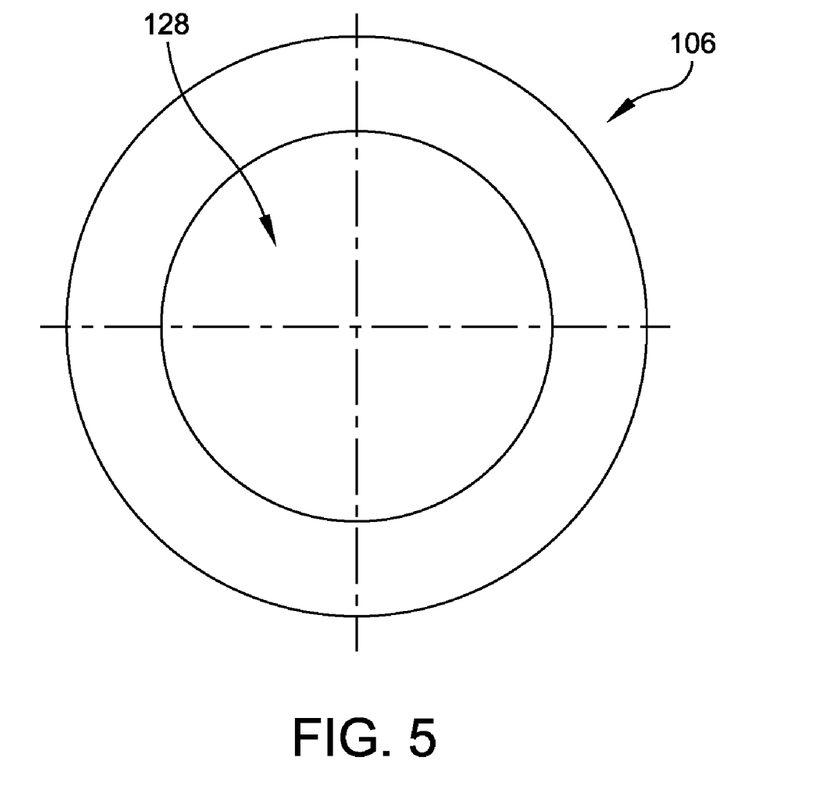
FIG. 5 is a top side plan view of one example of a spacer in accordance with the improved pit mount interface device illustrated in FIG. 1.
Figure 6:
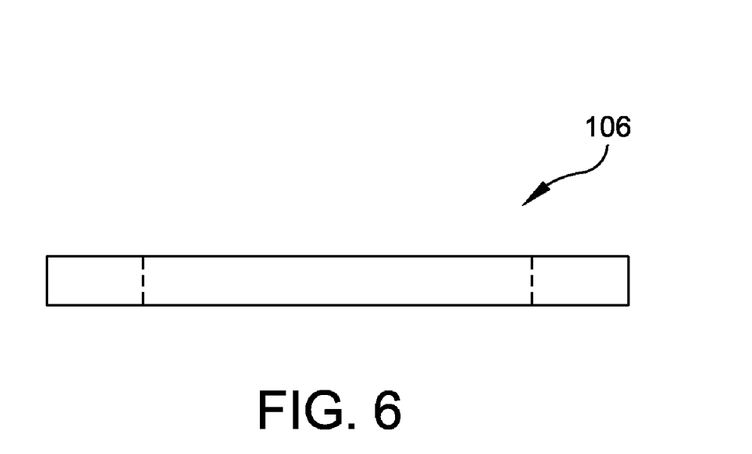
FIG. 6 is a section view of the spacer taken along line 6-6 in FIG. 5.
Figure 7:
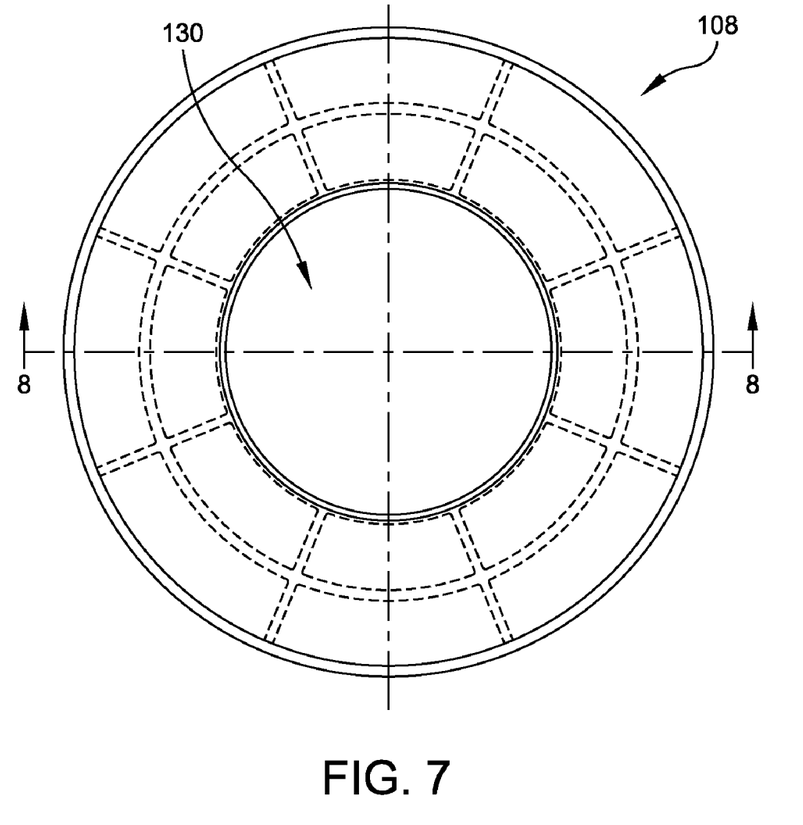
FIG. 7 is a top side plan view of one example of a washer in accordance with the improved pit mount interface device illustrated in FIG. 1.
Figure 8:
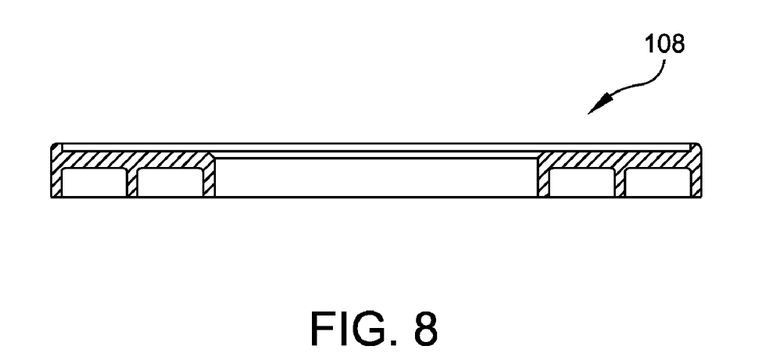
FIG. 8 is a side view of the washer illustrated in FIG. 7.

As best seen in FIG. 2-4, clamp nut 104 may be fabricated from a polymeric or plastic material including, but not limited to, polypropylene, polyethylene, or the like. Clamp nut 104 may define a central aperture 116 having a diameter of approximately 42 mm (approximately 1.65 inches) and include internal threads or annular grooves 118. A bottom surface 120 of the clamp nut 104 may include one or more protrusions 122 extending from the bottom surface 120 to provide a friction or gripping surface. The one or more protrusions 122 may be radially arranged on the bottom surface 120 around the central aperture 116. The protrusions 122 may define openings or slots 123 to facilitate fitting of additional devices to the PMI device 100 to indicate tampering. The top surface 124 of clamp nut 104 may include a raised ridge 126 extending from the top surface 124 around the periphery of the central aperture 116. In one embodiment, the outer diameter of the raised ridge 126 is approximately 50 mm (approximately 1.97 inches) while extending approximately 2.5 mm (approximately 0.1 inches) from the top surface 124.

Turning now to FIGS. 5-8, washer 106 and spacer 108 may also be formed from a rubber, a polymer, or a plastic material such as polypropylene. Spacer 106 may have a central aperture 128 having a diameter that is sufficiently large such that ridge 126 may be received therein. In one embodiment, the spacer member 106 has an outer diameter of approximately 76 mm (approximately 3 inches), and the central aperture 128 has a diameter of approximately 51 mm (approximately 2 inches). One skilled in the art will understand that the dimensions of spacer 106 may be varied. Optional spacer 108 may also define a central aperture 130.

Figure 9:
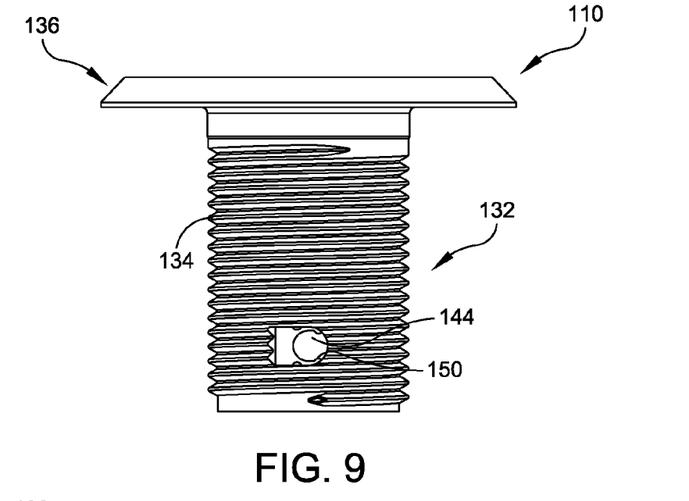
FIG. 9 is a side view of one example of a mounting body in accordance with the improved pit mount interface device illustrated in FIG. 1.

As best seen in FIG. 9, mounting body 110 has a head 136 and an elongate cylindrical stem 132 extending from a bottom surface of the head 136. The elongate stem 132 has a plurality of threads 134 or other engagement features, such as annular grooves, disposed on an exterior surface thereof. The head 136 may have a convex shape and have an outer diameter (or cross-sectional width) that is greater than the outer diameter (or cross-sectional width) of the elongate stem 132. In some embodiments, the outer diameter of the head 136 is approximately 87 mm (approximately 3.43 inches), and the outer diameter of the elongate stem 132 is approximately 42 mm (approximately 1.65 inches). The mounting body 110 defines a central passageway 138 having a diameter sufficiently large to receive a portion of the neck 140 of the AMR unit 102 therein.

Figure 10:
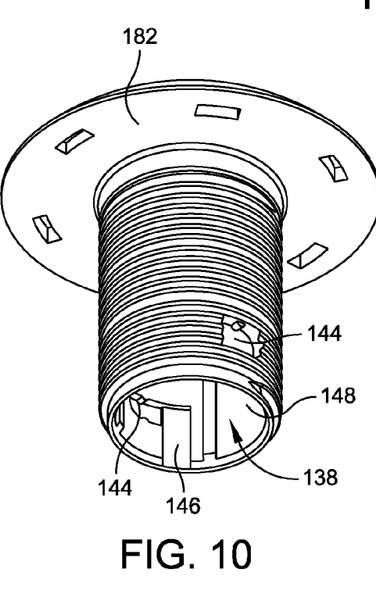
FIG. 10 is a bottom side isometric view of the mounting body illustrated in FIG. 9.

As best seen in FIGS. 9 and 10, the elongate stem 134 defines one or more openings 144 towards it lower end, which are sized and configured to receive ears (or other protrusions) 142 extending from the neck 140 of the AMR unit 102. Openings 144 may be diametrically opposed from one another or be otherwise positioned along the interior surface of the elongate stem 134 such that they correspond with the position of the projections 142 of AMR unit 102. Each of the one or more openings 144 may communicate with a shallow slot 146 formed in the interior surface 148 of the stem 132 as shown in FIG. 10. The shallow slot 146 may extend from the bottom of the stem 132 to a position that is adjacent to the opening 144 defined by the stem 132 such that the ears 142 may be positioned in the opening 144 by turning or rotating AMR unit 102 relative to the mounting body 110. Each opening 144 may include a pair of detents 150 to secure the ears 142 within the opening 144.

Figure 11:
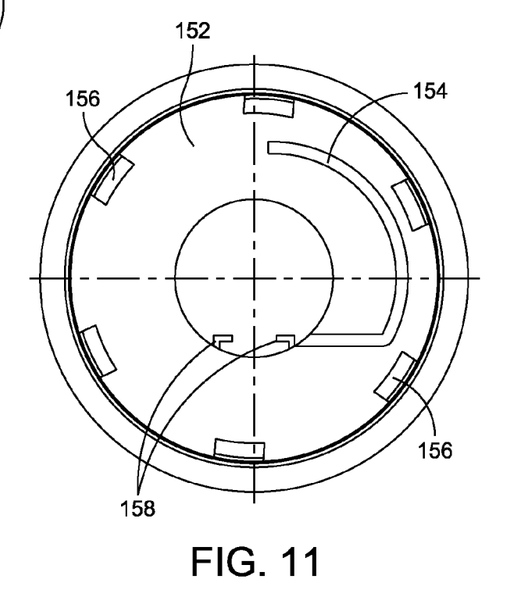
FIG. 11 is a top side plan view of the mounting body illustrated in FIG. 9.

Turning now to FIG. 11, it can be seen that the top interior surface 152 of the mounting body 110 defines a channel or trough 154 having a depth of approximately 0.9 mm (approximately 0.04 inches) and that has a complementary shape to that of the passive radiator 114. Additionally, the top interior surface 152 of the mounting body 110 defines one or more cutouts 156 radially disposed around its periphery. Cutouts 156 may take a variety of shapes including, but not limited to, rectangular, oval, circular, and semi-circular to name a few. The thickness of the head 136 is approximately 6.35 mm (approximately 0.25 inches), although one skilled in the art will appreciate that the head 136 of the mounting body 110 may have other widths. A pair of tabs 158 extend from the interior surface 148 of the mounting body 110. Preferably, the mounting body 110 is fabricated from a polymeric or plastic material.

Figures 14, 15, 16, 17, 18:
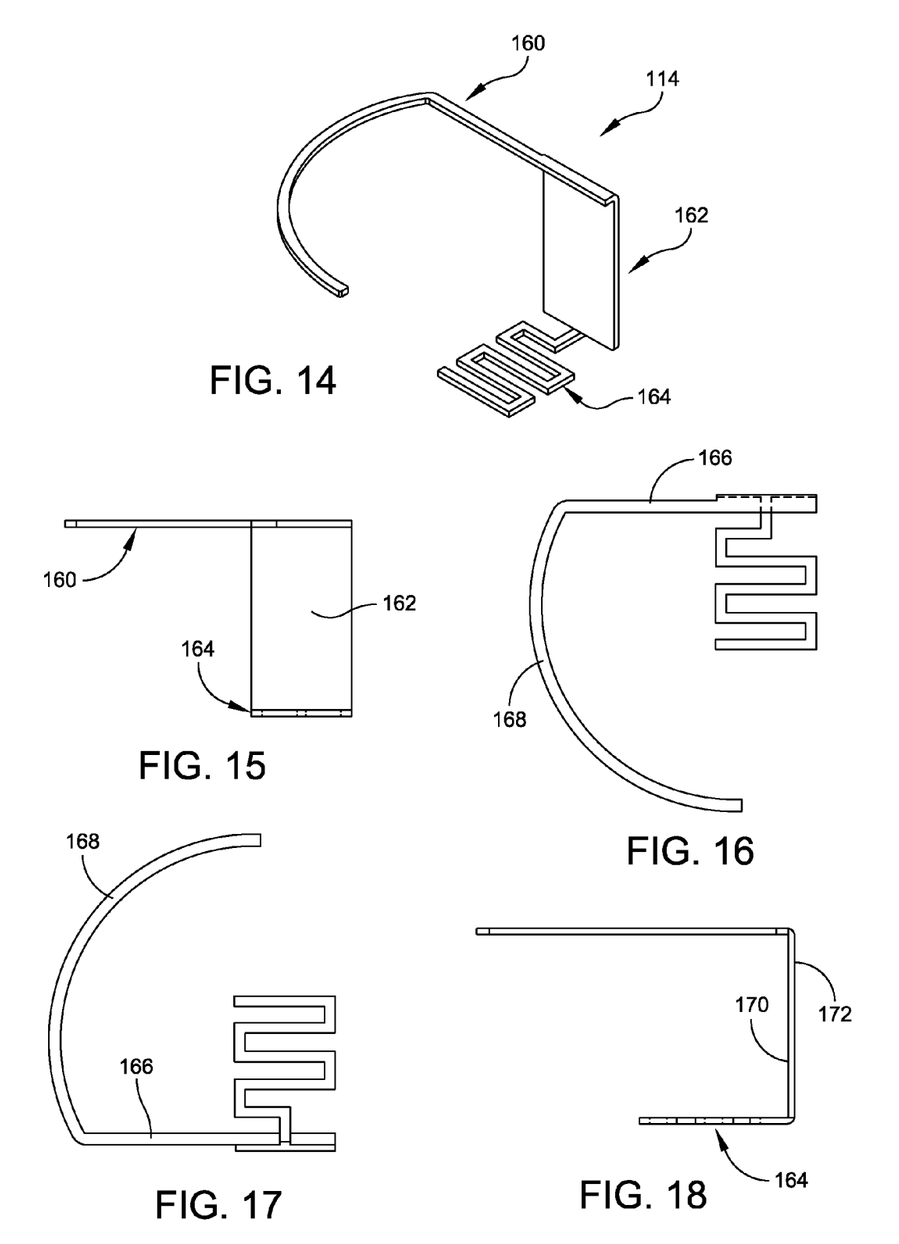
FIG. 14 is a top isometric view of one example of a passive radiator in accordance with the improved pit mount interface device illustrated in FIG. 1.
FIG. 15 is a front side plan view of the passive radiator illustrated in FIG. 14.
FIG. 16 is a top side plan view of the passive radiator illustrated in FIG. 14.
FIG. 17 is a bottom side plan view of the passive radiator illustrated in FIG. 14.
FIG. 18 is a side view of the passive radiator illustrated in FIG. 14.

FIG. 14-18 show various view of the passive radiator 114, which may be fabricated, e.g., stamped and folded, from a single piece of stainless steel, iron, brass, copper, or any other material that conducts electromagnetic waves. The passive radiator 114 includes a radiating section 160, a planar conductor section 162, and a coupling section 164. The radiating and coupling sections 160, 164 are disposed in substantially parallel, spaced apart planes separated by the conductor section 162 as best seen in FIG. 15. The conductor section 162 extends in a plane that is substantially perpendicular to the planes in which the radiating and coupling sections 160, 164 are disposed.

As shown in FIG. 17, the radiating section 160 includes a substantially straight portion 166 and a curved portion 168. In one embodiment, the passive radiator 114 is configured to radiate a signal at approximately 915 MHz with the straight portion 166 having a length of approximately 19.4 mm (approximately 0.76 inches) as measured from the edge of the conductor section 162 from which the straight portion 166 extends. The curved portion 168 has a radius of approximately 25.55 mm (approximately 1 inch) while terminating at a position that is approximately 9.78 mm (approximately 0.39 inches) from a second edge of the conductor section 162. One skilled in the art will understand that the dimensions of the radiating section 160 of the passive radiator 114 may be adjusted depending on the desired transmission frequency of the passive radiator 114.

The conductor section 162 of passive radiator 114 may have a substantially rectangular shape having a width of approximately 13 mm (approximately 0.51 inches), a length of approximately 25 mm (approximately 0.98 inches), and a thickness of approximately 0.8 mm (approximately 0.03 inches). The conductor section 162 has an interior side 170, which for the purposes of this document is the side of the conductor section 162 from which the curved portion 168 of the radiating section 160 projects, and an exterior side 172 opposite the interior side 170.

As best seen in FIG. 18, the coupling section 164 orthogonally extends from the interior side 170 of the conductor section 162. The coupling section 164 may have an orthogonally winding pattern forming a coil. In one embodiment, the coupling section 164 may have a width approximately equal to the width of the conductor section 162, e.g., approximately 13 mm (approximately 0.51 inches), and have an overall length of approximately 19.5 mm (approximately 0.77 inches).

Figure 12:
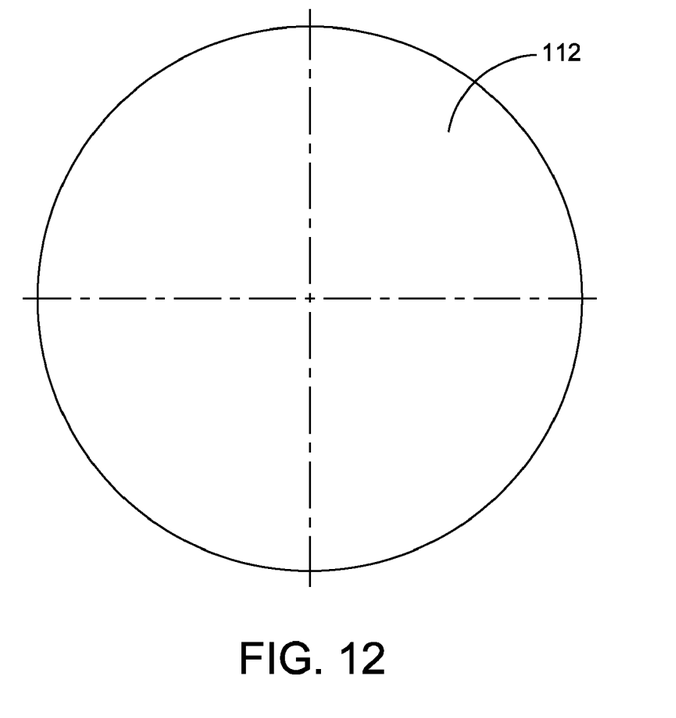
FIG. 12 is a top side plan view of one example of a cap in accordance with the improved pit mount interface device illustrated in FIG. 1.
Figure 13:
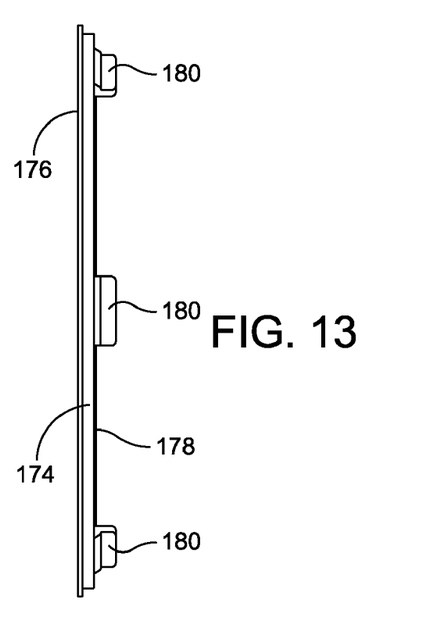
FIG. 13 is a side view of the cap illustrated in FIG. 12.

Turning now to FIGS. 12 and 13, cap 112 has a body portion 174 having a top surface 176 and a bottom surface 178. One or more latches 180 extend from the bottom surface 178 of the cap 112. The latches 180 may be disposed in a radial arrangement around the outer perimeter of the cap 112 such that may engage the one or more cutouts 156 of the mounting body 110. Preferably, the cap 112 is fabricated from a polymeric or plastic material so as to not interfere with the transmission and reception of electromagnetic waves from the passive radiator 114. In one embodiment, the cap 112 may have an outer diameter of approximately 75 mm (approximately 2.95 inches) and a thickness of approximately 1 mm (approximately 0.04 inches). However, one skilled in the art will understand that the size and shape of the cap 112 may varied as the size and shape of the head 136 of the mounting body 110 is varied.

Figure 19:
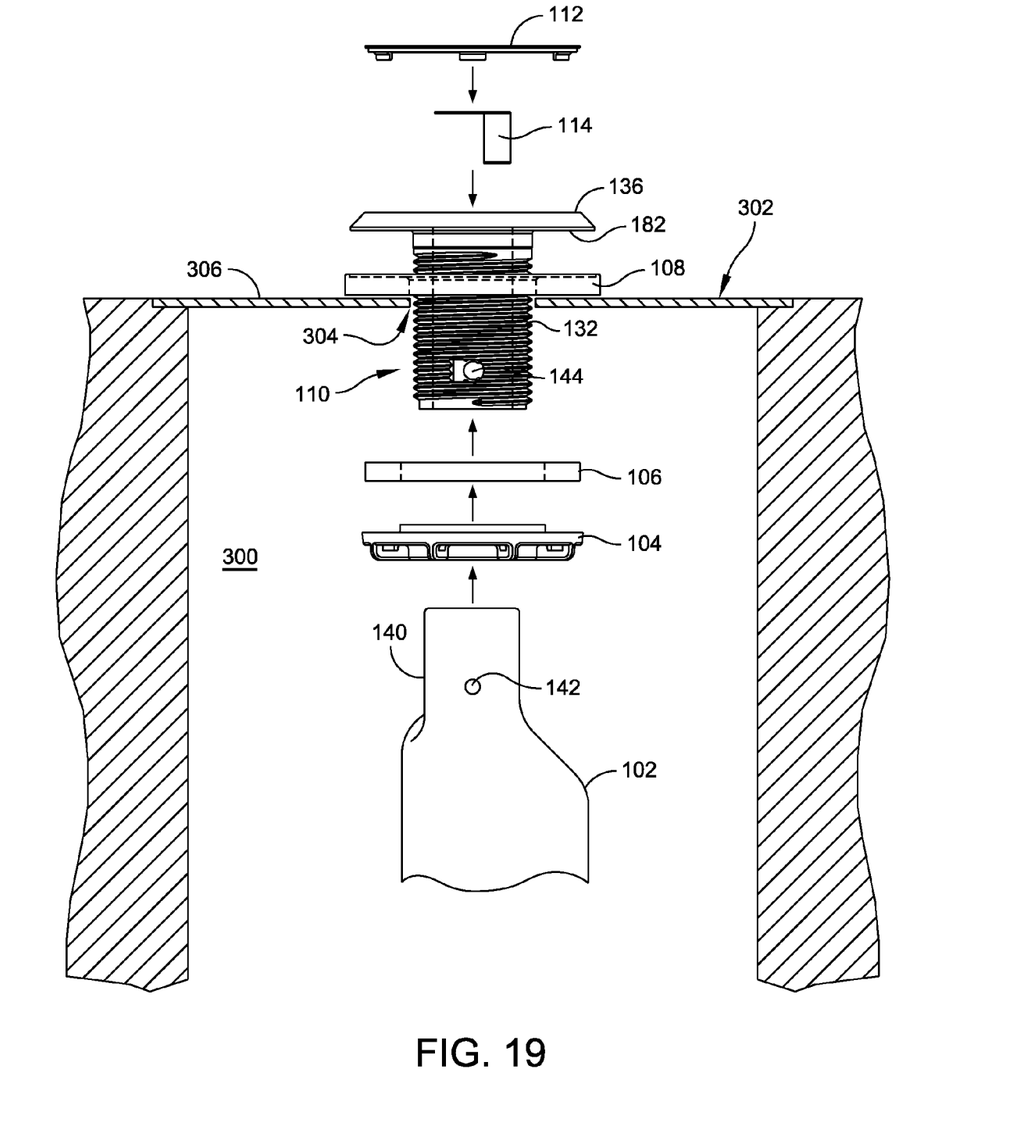
FIG. 19 is an exploded assembly view of an improved pit mount interface device being installed in a pit.

One example of assembling the device 100 is illustrated in FIG. 19. To assemble the device 100, the elongate stem 132 of the mounting body 110 is placed through the central aperture 130 of spacer 108 such that the bottom surface 182 of head 136 of the mounting body 110 is disposed against the spacer 108. As described below, the passive radiator 114 and cover 112 may already be assembled with the mounting body 110 when the stem 132 is placed through central aperture 130 of spacer 108. The elongate stem 132 of the mounting body 110 is placed in a hole 304 defined by a cover 302 of a utility pit 300 such that the spacer 108 is disposed between the bottom surface 182 of the head 136 of mounting body 110 and the pit cover 302. The washer 106 is then slid over the elongate stem 132 of the mounting body 110, and the clamp nut 104 is screwed onto the stem 132 to secure the mounting body 110 within the hole 302 of the pit cover 302.

With mounting body 110 secured to the pit cover 302, the AMR unit 102 may be secured to the mounting body 110 by aligning the ears 142 of the AMR unit 102 with the slots 146 formed on the interior surface 148 of the elongate stem 132. The AMR unit 102 is then slid into the central passageway 138 with the ears being received within the slots 146. When the AMR unit 102 has reached its maximum insertion it may be rotated with respect to the body 110 until the ears 142 are received in the openings 144 passed the detents 150.

The passive radiator 114 may be installed in the mounting body 110 before or after the AMR unit 102 is connected to the mounting body 110. To install the passive radiator 114 in the body 110, the edges of conductor section 162 of the passive radiator 114 are slid into the spaces defined by the tabs 158 disposed on the inner surface 148 of the central passageway 138 defined by the mounting body 110. The passive radiator 114 slides along tabs 158 until the radiating section 160 is received within the channel or trough 154 defined by the top inner surface 152 of the head portion 136 of the mounting body 110.

The passive radiator 114 is secured in place by placing the cap 112 on the mounting body 110. The cap 112 is secured in place by latches 180, which are received in the corresponding cutouts 156 formed in the top inner surface 150 of the mounting body 110. The cap 112 may be further secured by ultrasonically welding it to the mounting body 110.

The AMR unit 102 may be coupled to a utility meter, such as a water or gas meter, by wires (not shown). In operation, the AMR unit 102 receives signals from the utility meter, which it then uses to determine the amount of the commodity, e.g., water, gas, or the like, being used as measured by the meter. The AMR unit 102 then transmits a radio frequency (RF) signal from its internal antenna (not shown).

The coupling section 164 of the passive radiator 114 receives the RF signal transmitted by the internal antenna of the AMR unit 102 through inductive coupling. The inductive coupling induces resonance between the orthogonal coil of the coupling section 164 and the internal antenna of the AMR unit 102. The conductor section 162 of the passive radiator 114 provides a pathway for resonance between the coupling section 164 and the radiating section 160. The interface between the conductor section 162 and the radiating section 160, which is created by folding the radiating section 160 with respect to the coupling section 164, also resonates and radiates in a vertical direction enhancing the transmission of the passive radiator 114. The substantially straight portion 166 of the radiating section 160 radiates at the interface between the substantially straight potion 166 and the curved portion 168 enabling the radiated signal to escape difficult pit locations and minimize signal attenuation. The curved portion 168 tunes the radiated signal to the desired frequency. Accordingly, the device 100 provides enhanced transmission of an RF signal transmitted by an AMR unit by advantageously inductively coupling an RF signal transmitted by an AMR device located below ground into a passive radiator located above ground. The device 100 provides for gains of 10 dBm or more compared to conventional systems in which the AMR unit is disposed completely below the pit lid.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A pit mount interface device, comprising:
a body having a head and an elongate stem extending from a bottom surface of the head, the elongate stem sized and configured to be received in and extend through a hole formed in a cover of a pit;
a nut defining a central aperture sized and configured to receive the elongate stem of the body, the nut for coupling the body to pit cover;
a passive radiator disposed within the body and configured to receive a radio frequency (RF) signal transmitted by an automatic meter reading (AMR) device located below the cover through inductive coupling and radiate the RF signal from a position located above the cover of the pit; and
a pair of spaced apart tabs extending from an interior surface of the elongate stem, the pair of spaced apart tabs sized and configured to slidably receive a conducting section of the passive radiator.

2. The pit mount interface device of claim 1, wherein the passive radiator includes a radiating section, a coupling section, and the conducting section disposed between the radiating section and the coupling section.

3. The pit mount interface device of claim 2, wherein a plane defined by the coupling section is spaced apart from a plane defined by the radiating section.

4. The pit mount interface device of claim 2, wherein the coupling section includes a plurality of segments, each of the segments extending from an adjacent segment in a substantially orthogonal direction from a direction in which the adjacent segment extends.

5. The pit mount interface device of claim 2, wherein the head of the body defines a channel in which the radiating section of the passive radiator is disposed.

6. The pit mount interface device of claim 1, wherein an interior of the body defines a pair of slots that extend from a bottom of the elongate stem, each of the slots communicating with a respective opening defined by the elongate stem and configured to slidably receive an ear extending from the AMR device.

7. A pit mount interface device, comprising:
a body having a head and an elongate stem extending from a bottom surface of the head, the elongate stem having a width that is smaller than a width of the head and including at least one thread disposed on an external surface;
a nut defining a central aperture that is sized and configured to receive the elongate stem of the body, an interior surface of the nut including a thread configured to engage the thread disposed on the external surface of the elongate stem;
a passive radiator disposed within a channel defined by the head of the body and configured to receive a radio frequency (RF) signal transmitted by an automatic meter reading (AMR) device disposed adjacent to a coupling section of the passive radiator through inductive coupling and to radiate the RF signal from a radiating section of the passive radiator positioned above a cover of a pit;
a cap configured to be coupled to the head of the body such that the radiating section of the antenna is secured within a slot; and
a pair of spaced apart tabs extending from an interior surface of the elongate stem, the pair of spaced apart tabs sized and configured to slidably receive a conducting section of the passive radiator.

8. The pit mount interface device of claim 7, wherein a plane defined by a coupling section of the passive radiator is spaced apart from a plane defined by the radiating section by the conducting section of the passive radiator.

9. The pit mount interface device of claim 7, wherein an interior of the body defines a pair of slots that extend from a bottom of the elongate stem, each of the slots communicating with a respective opening defined by the elongate stem and configured to slidably receive a projection extending from the AMR device.

10. The pit mount interface device of claim 7, wherein the coupling section includes a plurality of segments, each of the segments extending from an adjacent segment in a substantially orthogonal direction from a direction in which the adjacent segment extends.

11. The pit mount interface device of claim 7, wherein the elongate stem has a cylindrical shape.

12. The pit mount interface device of claim 8, wherein the conducting section has a substantially rectangular shape extending between the radiating section and the coupling section.

13. The pit mount interface device of claim 9, wherein the elongate stem has a circular cross sectional area and the openings defined by the elongate stem are diametrically opposed from one another.

14. A method of installing a pit mount interface device, comprising:
inserting a passive radiator into a mounting body having an elongate stem extending from a head, the elongate stem having a substantially circular cross-sectional area defining a central passageway, wherein inserting the passive radiator into the mounting body includes sliding edges of a conducting section of the passive radiator along a pair of spaced apart tabs that extend from an interior surface of the elongate stem until a radiating section of the passive radiator is received within a channel defined by the head of the mounting body;
attaching a cap to the head of the mounting body to secure the passive radiator within the mounting body;
inserting the elongate stem into a hole defined by a cover of a pit until a bottom surface of the head of the elongate body contacts a surface of the cover; and fastening a clamp nut to the elongate stem to secure the mounting body to the cover.

15. The method of claim 14, further comprising:
aligning a pair of projections that extend from a neck of the AMR device with a pair of slots defined by an interior surface of the elongate stem;
advancing the neck of the AMR device into the central passageway of the elongate stem; and
rotating the AMR device such that the projections are received within a pair of openings defined by the elongate stem, each opening in communication with a respective one of the slots defined by the interior surface of the elongate stem.

16. The method of claim 15, wherein a coupling section of the passive radiator is disposed adjacent to the neck of the AMR device within the central passageway after the passive radiator has been inserted into the mounting body and the neck of the AMR device has been advanced into the central passageway.

17. The method of claim 14, wherein the conducting section of the passive radiator is disposed between the radiating section and a coupling section of the passive radiator.

18. A pit mount interface device, comprising:
a body having a head and an elongate stem extending from a bottom surface of the head, the elongate stem sized and configured to be received in and extend through a hole formed in a cover of a pit;
a nut defining a central aperture sized and configured to receive the elongate stem of the body, the nut for coupling the body to pit cover; and
a passive radiator disposed within the body and configured to receive a radio frequency (RF) signal transmitted by an automatic meter reading (AMR) device located below the cover through inductive coupling and radiate the RF signal from a position located above the cover of the pit, the passive radiator including a radiating section, a coupling section, and a conductor section disposed between the radiating section and the coupling section comprising a plurality of segments, each of the segments of the coupling section extending from an adjacent segment in a substantially orthogonal direction from a direction in which the adjacent segment extends.

19. The pit mount interface device of claim 18, wherein a plane defined by the coupling section is spaced apart from a plane defined by the radiating section.

20. The pit mount interface device of claim 18, wherein the head of the body defines a channel in which the radiating section of the passive radiator is disposed.

21. The pit mount interface device of claim 18, wherein an interior of the body defines a pair of slots that extend from a bottom of the elongate stem, each of the slots communicating with a respective opening defined by the elongate stem and configured to slidably receive an ear extending from the AMR device.

22. The pit mount interface device of claim 18, further comprising a pair of spaced apart tabs extending from an interior surface of the elongate stem, the pair of spaced apart tabs sized and configured to slidably receive the conducting section of the passive radiator.

23. A method of installing a pit mount interface device, comprising:
inserting a passive radiator into a mounting body having an elongate stem extending from a head, the elongate stem having a substantially circular cross-sectional area defining a central passageway;
attaching a cap to the head of the mounting body to secure the passive radiator within the mounting body;
inserting the elongate stem into a hole defined by a cover of a pit until a bottom surface of the head of the elongate body contacts a surface of the cover;
fastening a clamp nut to the elongate stem to secure the mounting body to the cover;
aligning a pair of projections that extend from a neck of the AMR device with a pair of slots defined by an interior surface of the elongate stem;
advancing the neck of the AMR device into the central passageway of the elongate stem; and
rotating the AMR device such that the projections are received within a pair of openings defined by the elongate stem, each opening in communication with a respective one of the slots defined by the interior surface of the elongate stem.

24. The method of claim 23, wherein a coupling section of the passive radiator is disposed adjacent to the neck of the AMR device within the central passageway after the passive radiator has been inserted into the mounting body and the neck of the AMR device has been advanced into the central passageway.

25. The method of claim 23, wherein inserting the passive radiator into the mounting body includes sliding edges of a conducting section of the passive radiator along a pair of spaced apart tabs that extend from an interior surface of the elongate stem until a radiating section of the passive radiator is received within a channel defined by the head of the mounting body.

26. The method of claim 25, wherein the conducting section of the passive radiator is disposed between the radiating section and a coupling section of the passive radiator.

* * * * *